(12) United States Patent
Sridhar et al.

(10) Patent No.: US 8,086,692 B2
(45) Date of Patent: Dec. 27, 2011

(54) SYSTEM AND METHOD FOR EFFICIENT DELIVERY IN A MULTI-SOURCE, MULTI DESTINATION NETWORK

(75) Inventors: Varadarajan Sridhar, Bangalore (IN); Srividya Gopalan, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 137 days.

(21) Appl. No.: 12/199,658

(22) Filed: Aug. 27, 2008

(65) Prior Publication Data
US 2010/0057909 A1 Mar. 4, 2010

(51) Int. Cl.
G06F 7/00 (2006.01)
G06F 15/16 (2006.01)
G06F 15/173 (2006.01)

(52) U.S. Cl. ......... 709/217; 707/802; 709/225; 709/232
(58) Field of Classification Search .................. 709/225, 709/217, 232; 707/802
See application file for complete search history.

(56) References Cited

U.S. PATENT DOCUMENTS

| | | | |
|---|---|---|---|
| 5,603,058 A * | 2/1997 | Belknap et al. ............. 710/35 |
| 5,768,527 A | 6/1998 | Zhu et al. |
| 6,879,972 B2 * | 4/2005 | Brandon et al. ............. 706/45 |
| 7,062,567 B2 | 6/2006 | Benitez et al. |
| 7,133,925 B2 | 11/2006 | Mukherjee et al. |
| 7,164,680 B2 | 1/2007 | Loguinov |
| 7,274,661 B2 | 9/2007 | Harrell et al. |
| 7,305,486 B2 | 12/2007 | Ghose et al. |
| 7,313,596 B2 | 12/2007 | Tani et al. |
| 7,373,415 B1 * | 5/2008 | DeShan et al. .............. 709/231 |
| 2002/0080170 A1 * | 6/2002 | Goldberg et al. ............. 345/748 |
| 2003/0005040 A1 * | 1/2003 | Kukkal ....................... 709/203 |
| 2003/0023638 A1 * | 1/2003 | Weight ....................... 707/526 |
| 2003/0107592 A1 * | 6/2003 | Li et al. ....................... 345/745 |
| 2003/0144961 A1 * | 7/2003 | Tharaken et al. ............. 705/57 |
| 2004/0009815 A1 * | 1/2004 | Zotto et al. ................... 463/42 |
| 2004/0117427 A1 | 6/2004 | Allen et al. |
| 2005/0034065 A1 * | 2/2005 | Weight ....................... 715/513 |
| 2005/0086254 A1 * | 4/2005 | Zou et al. ..................... 707/102 |
| 2005/0091289 A1 * | 4/2005 | Shappell et al. .............. 707/201 |
| 2005/0091595 A1 * | 4/2005 | Shappell et al. .............. 715/700 |

(Continued)

OTHER PUBLICATIONS

Fodor, et al., "Resilience in Live Peer-To-Peer Streaming", IEEE Communications Magazine, vol. 45, No. 6, Jun. 2007.

(Continued)

*Primary Examiner* — Phuoc Nguyen
*Assistant Examiner* — Daniel Murray
(74) *Attorney, Agent, or Firm* — Merek, Blackmon & Voorhees LLC

(57) ABSTRACT

Real-time delivery of multimedia content puts extreme demand on both computational and network resources. Many a times, the requirement is to handle multiple such delivery requirements and as a consequence, the overall delivery efficiency gets affected. Another dimension of complexity is that (a) the multimedia content to be delivered may not always be highly reliable, and (b) the network may also be not highly reliable. In such a situation, it becomes even more difficult to satisfy the quality of service requirements. When content to be delivered to multiple destinations is available at multiple sources, there is an opportunity to overcome the above mentioned complexity. The system and method for efficient delivery in a multi-source multi-destination network involves pulling of data from the multiple sources by measuring quality of service and reliability parameters, and efficiently loading the systems and the network in a cooperative manner.

1 Claim, 5 Drawing Sheets

A Brief Description of MSMDDS

U.S. PATENT DOCUMENTS

| | | | |
|---|---|---|---|
| 2006/0058009 A1* | 3/2006 | Vogedes et al. | 455/412.1 |
| 2006/0173974 A1* | 8/2006 | Tang | 709/217 |
| 2006/0206303 A1* | 9/2006 | Kohlmeier et al. | 704/2 |
| 2006/0206797 A1* | 9/2006 | Kohlmeier et al. | 715/500.1 |
| 2006/0206798 A1* | 9/2006 | Kohlmeier et al. | 715/500.1 |
| 2006/0206871 A1* | 9/2006 | Kohlmeier et al. | 717/132 |
| 2006/0206877 A1* | 9/2006 | Kohlmeier et al. | 717/137 |
| 2006/0242259 A1* | 10/2006 | Vallabh et al. | 709/217 |
| 2006/0253599 A1 | 11/2006 | Monteiro et al. | |
| 2007/0201502 A1* | 8/2007 | Abramson | 370/429 |
| 2007/0203945 A1* | 8/2007 | Louw | 707/104.1 |
| 2007/0204115 A1* | 8/2007 | Abramson | 711/154 |
| 2007/0288484 A1* | 12/2007 | Yan et al. | 707/10 |
| 2008/0005349 A1* | 1/2008 | Li et al. | 709/231 |
| 2010/0005171 A1* | 1/2010 | Arolovitch | 709/225 |

OTHER PUBLICATIONS

Locher, et al., "Push-To-Pull Peer-To-Peer Live Streaming", Lecture Notes in Computer Science, vol. 4731/2007, Springer Berlin/Heidelberg 2007.

Dán, et al., "An Analytical Study of Low Delay Multi-Tree-Based Overlay Multicast", Proceedings of the 2007 workshop on Peer-to-peer streaming and IP-TV, Kyoto, Japan, pp. 352-357, 2007.

Veeravalli, et al., "Design, Analysis, and Implementation of an Agent Driven Pull-Based Distributed Video-on-Demand System", Multimedia Tools and applications, vol. 28, No. 1, Springer Netherlands, Feb. 2006.

* cited by examiner

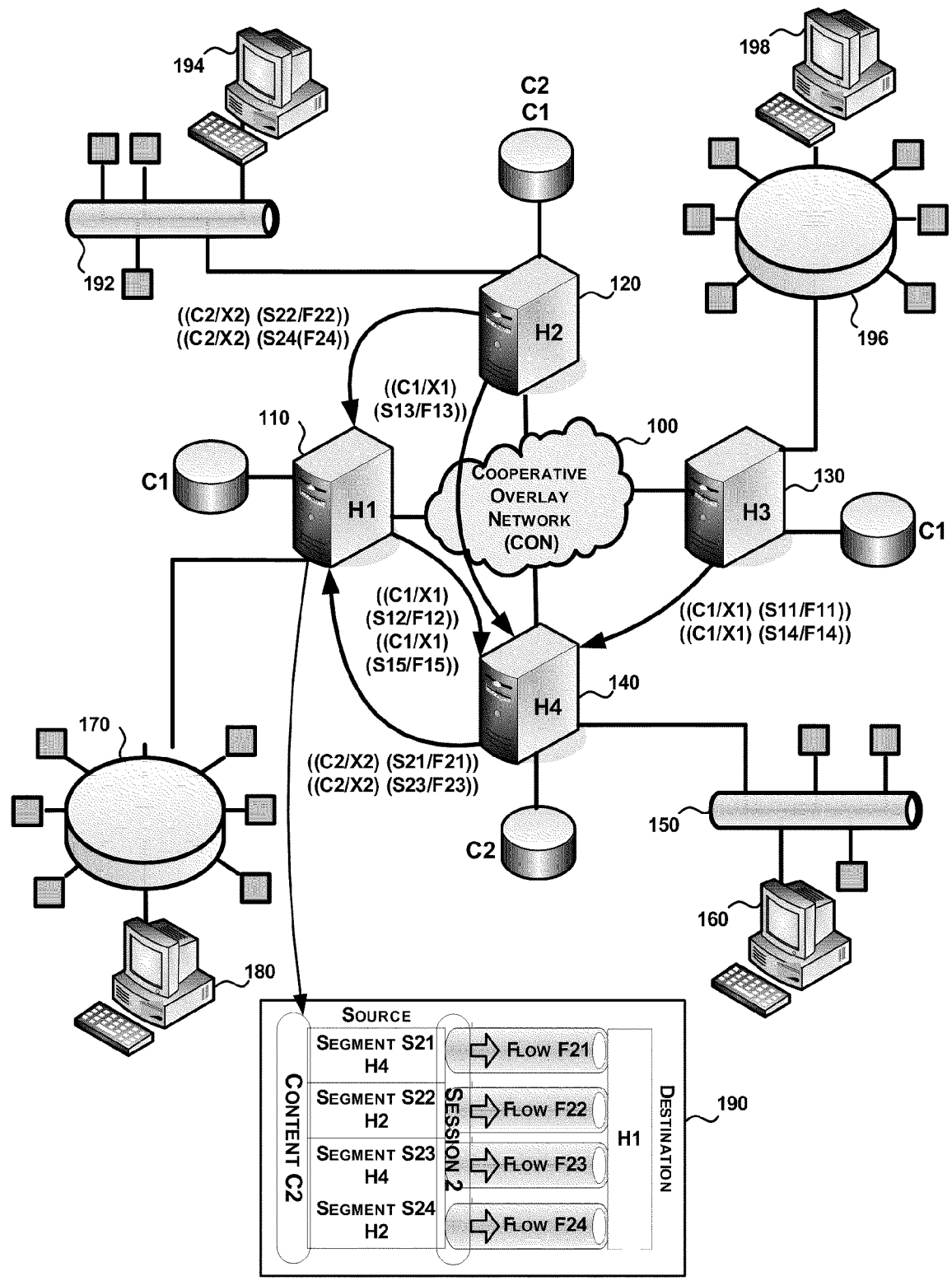
FIG. 1: AN ILLUSTRATIVE APPLICATION OF MSMDDS

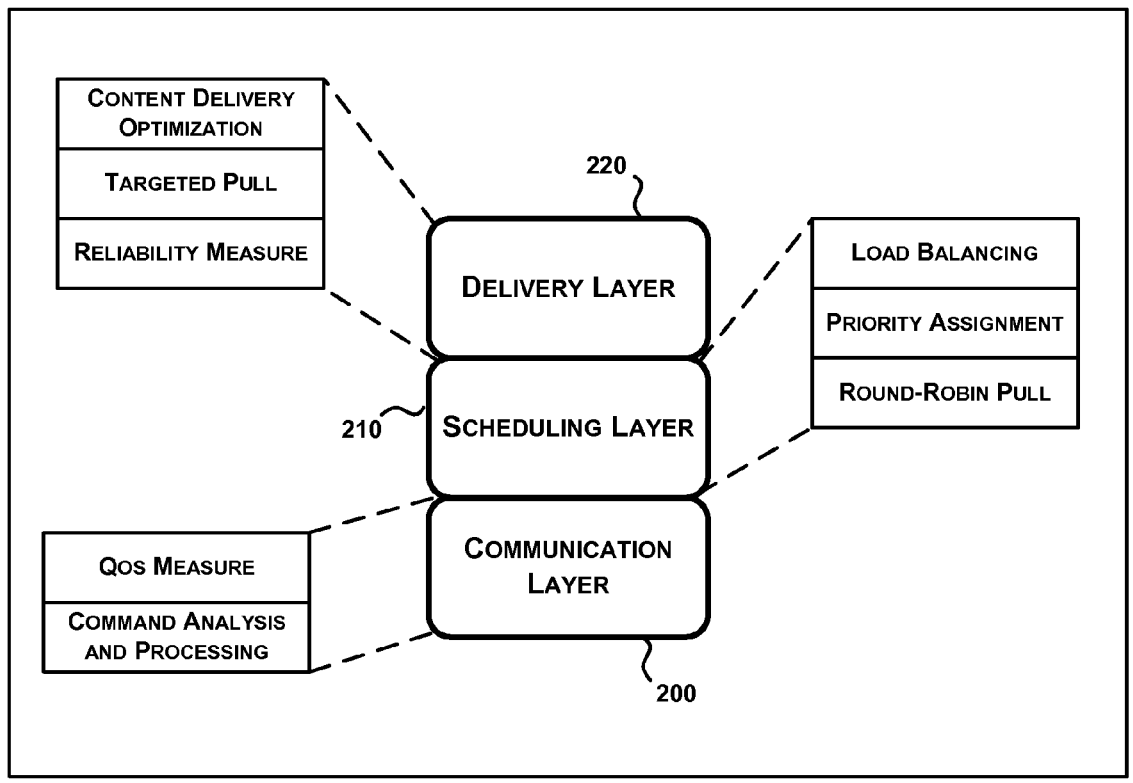
FIG. 2: AN ILLUSTRATIVE SYSTEM ARCHITECTURE OF MSMDDS
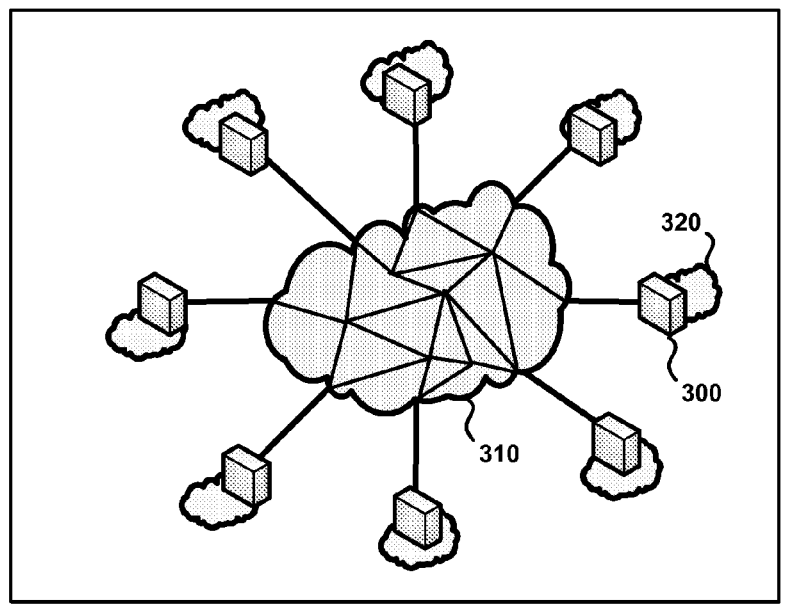
FIG. 3: AN ILLUSTRATIVE NETWORK ARCHITECTURE OF MSMDDS

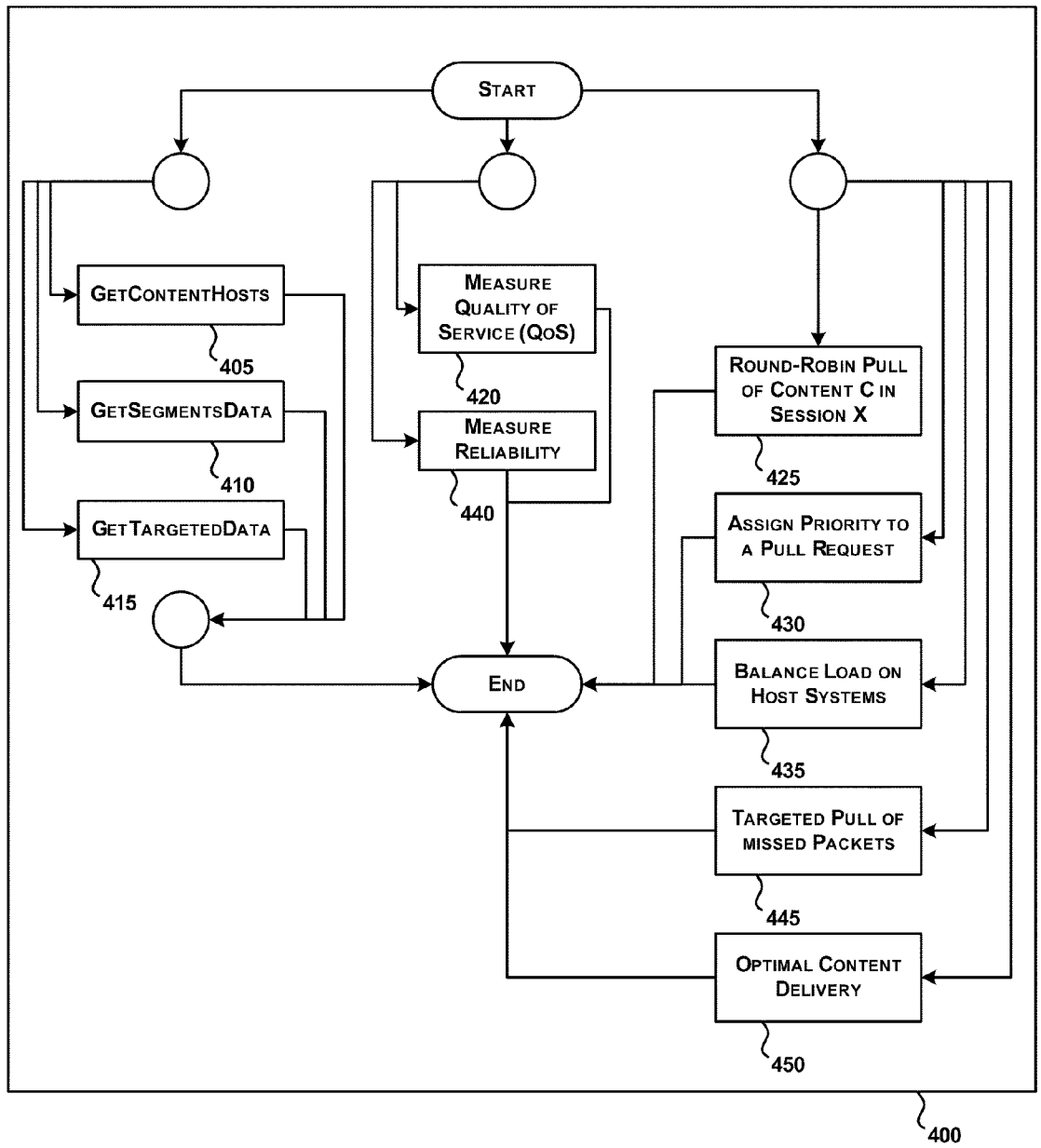
FIG. 4: A BRIEF DESCRIPTION OF MSMDDS

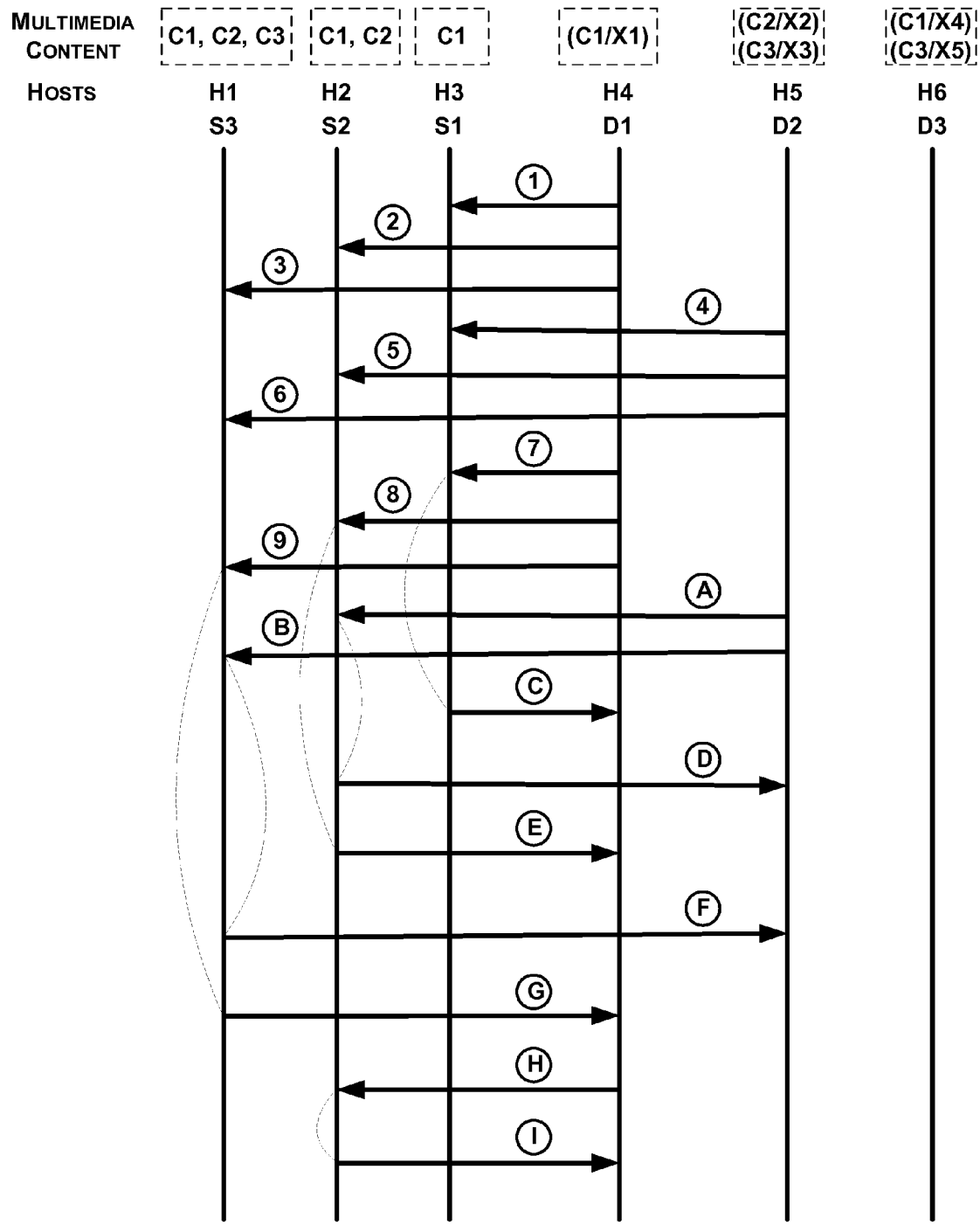
FIG. 5: AN ILLUSTRATIVE SEQUENCE DIAGRAM

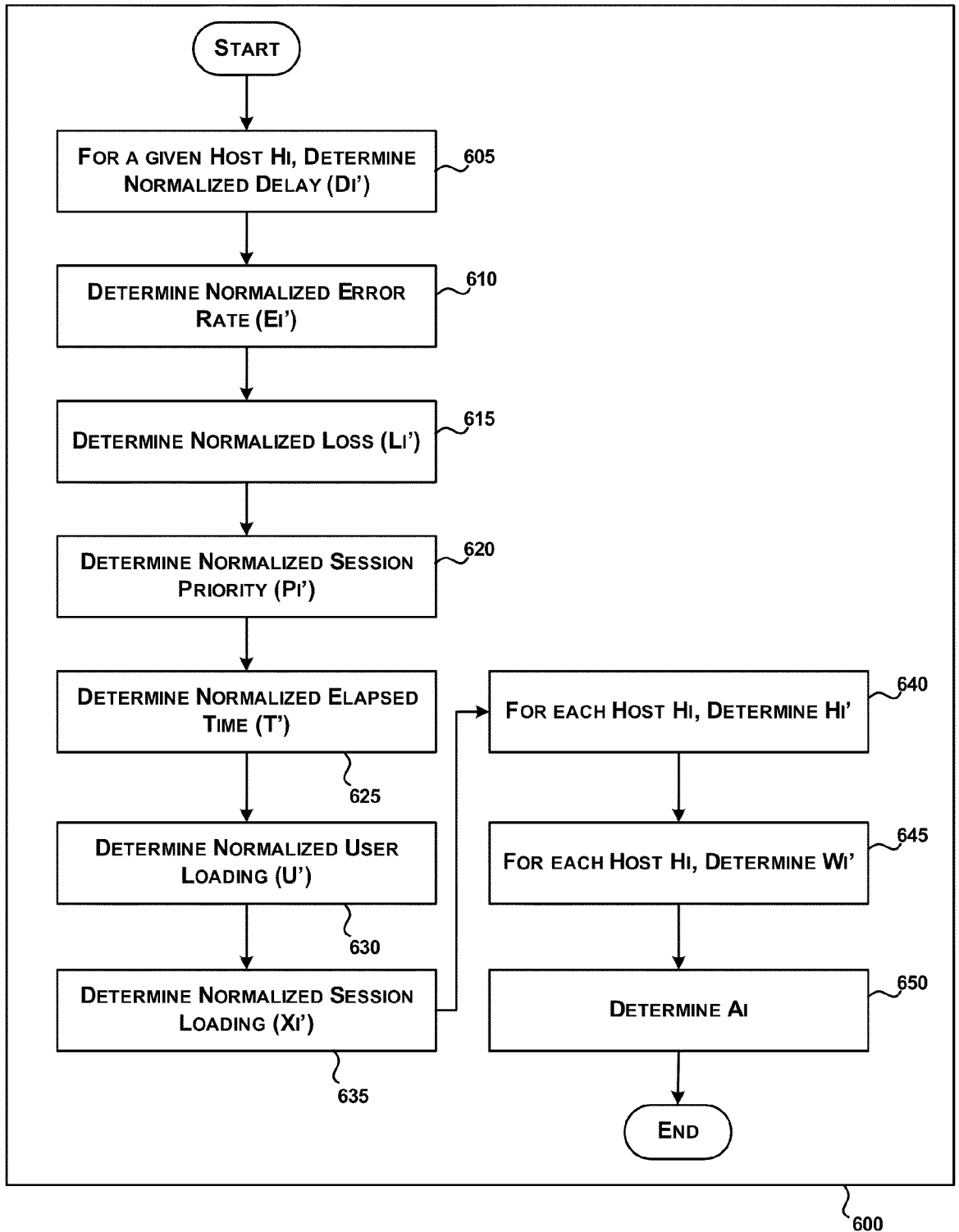
FIG. 6: PULL DISTRIBUTION ALGORITHM

SYSTEM AND METHOD FOR EFFICIENT DELIVERY IN A MULTI-SOURCE, MULTI DESTINATION NETWORK

FIELD OF THE INVENTION

The present invention relates to multimedia delivery in general and more particularly, efficient multimedia delivery through a network. Still more particularly, the present invention is related to a system and method for efficient delivery of multimedia across a not so highly reliable network with multiple sources also being not so highly reliable.

BACKGROUND OF THE INVENTION

Real-time delivery of multimedia requires extensive support from both systems and networks. The non-stop delivery, coupled with real-time constraints, needs consistent availability of both computational and network resources. However, one of the major problems to meet this expectation is the associated occasional unreliability. This unreliability leads not only to inefficient delivery of multimedia but also to the under utilization of resources.

Consider an enterprise scenario of delivering a multimedia content from multiple sources to multiple destinations across a network. In this scenario, the multiple sources possessing the same multimedia content is by virtue of being part of the same content generation/sourcing activity, and the multiple destinations requiring the same multimedia content is due to the need to deliver the same to multiple branch offices of the enterprise. Note that it is not realistic to expect a perfect delivery system with unfailing content sourcing, unfailing systems, and unfailing network. More importantly, the multimedia delivery system needs to be designed keeping this constraint in mind: delivering multiple multimedia contents from multiple sources to multiple destinations across a not so highly reliable network with not so highly reliable multimedia content sourcing.

One of the ways to overcome this constraint is to exploit redundancy: in fact, very highly reliable systems have high redundancy factor as well. This exploitation while improving reliability leads to reduced throughput from per unit resource consumption point of view. Hence, there is a need for balancing between under utilization of resources and over doing to meet higher reliability expectations. This poses a question of how to achieve on the fly reliability management coupled with load balancing. The degree of under utilization of resources could vary as failure is a random phenomenon: Not so highly reliable means that there is very good chance of successful completion but with occasional failures. This calls for a system design to guard against these occasional failures. In other words, redundancy needs to be exploited as a consequence of failure wherever it is appropriate. Such a design strives for utilizing redundancy for enhancing throughput as well as for addressing occasional failures.

DESCRIPTION OF RELATED ART

U.S. Pat. No. 7,313,596 to Tani; Seiichiro (Atsugi, JP), Miyazaki; Toshiaki (Yokohama, JP), Takahashi; Noriyuki (Yokosuka, JP), Murooka; Takahiro (Atsugi, JP), Ishihara; Shinya (Tokyo, JP), Inoue; Takeru (Yokohama, JP) for "Multicast data communication method, multicast data communication system, repeater, repeating method, and medium for storing repeating" (issued on Dec. 25, 2007 and assigned to Nippon Telegraph & Telephone Corporation (Tokyo, JP)) describes a multicast data communication system that has high security and prevents problems, such as attack by a malicious user, wherein clients regularly transmit request packets towards a server and the server delivers packets to clients based on request packet arrival times.

U.S. Pat. No. 7,305,486 to Ghose; Kanad (Vestal, N.Y.), Sulatycke; Peter (Vestal, N.Y.) for "System and method for fast, reliable byte stream transport" (issued on Dec. 4, 2007) describes a protocol using credits for flow control and negative acknowledgements for reliable delivery.

U.S. Pat. No. 7,274,661 to Harrell; Chandlee (Cupertino, Calif.), Ratner; Edward R. (Sunnyvale, Calif.), Miller; Thomas D. (Alamo, Calif.), Prakash; Adityo (Redwood Shores, Calif.), So; Hon Hing (San Jose, Calif.) for "Flow control method for quality streaming of audio/video/media over packet networks" (issued on Sep. 25, 2007 and assigned to Harrell; Chandlee (Cupertino, Calif.), Ratner; Edward R. (Sunnyvale, Calif.), Miller; Thomas D. (Alamo, Calif.), Prakash; Adityo (Redwood Shores, Calif.), So; Hon Hing (San Jose, Calif.)) describes a method and apparatus for client-side detection of network congestion in a best-effort packet network comprising streaming media traffic wherein a client media buffer detects at least one level of congestion and signals a server to enact at least one error mechanism.

U.S. Pat. No. 7,164,680 to Loguinov; Dmitri (Wappingers Falls, N.Y.) for "Scheme for supporting real-time packetization and retransmission in rate-based streaming applications" (issued on Jan. 16, 2007 and assigned to Koninklijke Philips Electronics N.V. (Eindhoven, NL)) describes a system and method for supporting real-time packetization of multimedia information and retransmission of lost multimedia packets over a packet network.

U.S. Pat. No. 7,133,925 to Mukherjee; Debargha (San Jose, Calif.), Said; Amir (Cupertino, Calif.) for "System, method, and format thereof for scalable encoded media delivery" (issued on Nov. 7, 2006 and assigned to Hewlett-Packard Development Company, L.P. (Houston, Tex.)) describes a system, method, and bit-stream format for delivery, wherein the media data is transcoded prior to delivery based on the receiving attributes of the media destination.

U.S. Pat. No. 7,062,567 to Benitez; Manuel Enrique (Cupertino, Calif.), Holler; Anne Marie (Santa Clara, Calif.), Shah; Lacky Vasant (Fremont, Calif.), Arai; Daniel Takeo (Sunnyvale, Calif.), Panwar; Sameer (Fremont, Calif.) for "Intelligent network streaming and execution system for conventionally coded applications" (issued on Jun. 13, 2006 and assigned to Endeavors Technology, Inc.) describes an intelligent network streaming and execution system for conventionally coded application to partition an application program into page segments, and streaming these page segments into a client as the application program executes on the client, wherein the client prefetches page segments or the application server pushes the additional page segments.

U.S. Pat. No. 5,768,527 to Zhu; Qin-Fan (Mansfield, Mass.), Sridhar; Manickam R. (Holliston, Mass.), Eyuboglu; M. Vedat (Concord, Mass.) for "Device, system and method of real-time multimedia streaming" (issued on Jun. 16, 1998 and assigned to Motorola, Inc. (Schaumburg, Ill.)) describes a system and method for real-time streaming of a multimedia file stored in a remote server over a packet network to a multimedia client connected to the same network via a low-speed access link such as an analog telephone line, wherein the invention operates to provide significantly improved quality of service with respect to both quality and delay.

U.S. Pat. No. 5,603,058 to Belknap; William R. (San Jose, Calif.), Fitchett; Larry W. (Morgan Hill, Calif.), Stansbury; Buddy F. (San Jose, Calif.) for "Video optimized media streamer having communication nodes received digital data from storage node and transmitted said data to adapters for generating isochronous digital data streams" (issued on Feb. 11, 1997 and assigned to International Business Machines Corporation (Armonk, N.Y.)) describes a media streamer with at least one control node, at least one storage node, a plurality of communication nodes, and an adapter for receiving a sequence of data bursts and for converting the received sequence of data bursts to a substantially isochronous data stream that represents a video presentation.

U.S. Pat. Application No. 2006/0253599 by Monteiro; Antonio M.; (New York, N.Y.); Butterworth; James F.; (New York, N.Y.) titled "System for delivering media" (published on Nov. 9, 2006) describes a system that delivers a continuous sequence of individual pierces of media information over a communication network to a group of users, wherein, the system includes a user interface screen that displays program guide and the system also maintains an audit log.

U.S. Pat. Application No. 2004/0117427 by Allen, Geoff; (Sterling, Va.); Ramsey, Timothy; (Chantilly, Va.); Geyer, Steve; (Herndon, Va.); Gardner, Alan; (Potomac, Md.); McElrath, Rod; (Fairfax, Va.) titled "System and method for distributing streaming media" (published on Jun. 17, 2004) describes a high-performance, adaptive, and scalable system for distributing streaming media, in which processing into a plurality of output formats is controlled in a real-time distributed manner, and which further incorporates processing improvements relating to workflow management, video acquisition and video preprocessing.

"Resilience in live peer-to-peer streaming" by Fodor, V. and Dan, G. (appeared in IEEE Communications Magazine, Vol. 45, No. 6, June 2007) provides a survey of the media distribution methods and overlay structures, and in particular discusses the trade-offs between resilience and overhead.

"Push-to-Pull Peer-to-Peer Live Streaming" by Locher, T., Meier, R., Schmid, S. and Wattenhofer, R. (appeared in Lecture Notes in Computer Science, Vol. 4731/2007, Springer Berlin/Heidelberg, 2007) describes an approach that combines low-latency push operations along a structured overlay with the flexibility of pull operations.

"An analytical study of low delay multi-tree-based overlay multicast" by Dán, G. and Fodor, V. (appeared in the Proceedings of the 2007 workshop on Peer-to-peer streaming and IP-TV, Kyoto, Japan, Pages 352-357, 2007) proposes an analytical model for characterizing end-to-end loss for live multicast streaming and considers push-based architectures combined with retransmissions and forward error correction.

"Design, analysis, and implementation of an agent driven pull-based distributed video-on-demand system" by Veeravalli, B. Chen, L., Kwoon, H., Whee, G., Lai, S. Hian, L., and Chow, H. (appeared in Multimedia Tools and Applications, Vol. 28, No. 1, Springer Netherlands, February, 2006) addresses the problem of employing multiple servers to serve a pool of clients on a network based multimedia and addresses the issues related to behavior of network infrastructure, client management, and resource management.

The known systems do not address the various issues related to the simultaneous handling of load balancing and occasional failures in the context of multimedia delivery in the context of multiple sources and multiple destinations. The present invention provides a system and method for addressing these issues in order to efficiently utilize system and network resources at the same time meeting quality of service requirements.

SUMMARY OF THE INVENTION

The primary objective of the invention is to efficiently deliver multimedia content from multiple sources to multiple destinations across a not so highly reliable network with content sources also being not so highly reliable.

One aspect of the invention is to measure parameters related to quality of service and delivery reliability.

Another aspect of the invention is to compute priority and load measures related to multiple sources and destinations.

Yet another aspect of the invention is to perform round-robin pull of a multimedia content from multiple sources.

Another aspect of the invention is to compute the amount of multimedia content to be pulled from each of the multiple sources.

Yet another aspect of the invention is to perform targeted pull of a multimedia content from a selected reliable source.

Another aspect of the invention is to perform prioritization of a plurality of pull requests at a source.

BRIEF DESCRIPTION OF THE DRAWINGS

FIG. 1 depicts an illustrative application of Multi-Source Multi-Destination Delivery System (MSMDDS).

FIG. 2 depicts an illustrative System Architecture of MSMDDS.

FIG. 3 depicts an illustrative Network Architecture of MSMDDS.

FIG. 4 provides a brief description of MSMDDS.

FIG. 5 provides an illustrative sequence diagram.

FIG. 6 provides a brief description of Pull Distribution Algorithm.

DETAILED DESCRIPTION OF THE PREFERRED EMBODIMENTS

Multi-source multi-destination multimedia content delivery involves providing of content from many of the sources to all of the destinations. In this scenario, each system is generically called as a host (as any such system could be a source for multimedia content) and these hosts are connected with each other through a network. Typically, different portions of the network get loaded differently, and different host systems also get loaded differently. This provides an opportunity to determine the best possible hosts for pulling the multimedia content. In order to deal with real-time multimedia content, the pulls happen at regular intervals and the availability of high speed systems and high speed networks indicate these intervals need not have to be very short. Given that multiple sources hosted on faster systems connected via a faster network deliver real-time multimedia content to multiple destination systems, the Multi-Source Multi-Destination Delivery System (MSMDDS) that is part of each host system ensures the efficient delivery of multimedia content from multiple sources to multiple destinations across the network. The main objective of the MSMDDS is to account for error and delay in delivery due to network and system conditions. This is achieved by on the fly measurements of quality of service and reliability parameters, number of users distributed across multiple local area networks requesting for real-time content, and number of such content deliveries that are under progress.

FIG. 1 depicts an illustrative application of MSMDDS. Multiple sources and destinations are connected via a cooperative overlay network (CON) (100). Host systems (110, 120, 130, and 140) that are part of the CON source multimedia content. For example, the host system (110) sources content C1, the host system (120) sources contents C1 and C2, the host system (130) sources content C1, and the host system (140) sources content C2. The host system (140) delivers content to the various users via a local area network (150). That is, the user (160) requiring content C1 receives the same through the local area network, and this content C1 is available at multiple sources (110, 120, and 130). In order to pull a multimedia content from multiple sources, the multimedia content is split into multiple segments and each segment has an associated flow during the pulling of a segment from a source. These multiple flows are logically related to a session that is associated with the receiving of the multimedia content in real-time. Hence, MSMDDS part of the host system (140) pulls the content C1 in session X1 as follows: S11 through F11 from 130, S12 through F12 from 110, S13 through F13 from 120, S14 through F14 from 130, and finally S15 through F15 from 110. Notice that the content C1 is split into segments S11, S12, S13, S14, and S15 for pulling purposes and this segmentation is dependent on the various measures such as QoS, reliability, and load.

Similarly, MSMDDS part of the host system (110) pulls the content C2 in session X2 to deliver the same to the user (180) through a local area network (170) as follows: S21 through F21 from 140, S22 through F22 from 120, S23 through F23 from 140, and finally S24 through F24 from 120. The overall content (C2) segmentation and delivering the segments through flows (F21-F24) of a session (Session 2) is depicted in 190. Note that the host system (120) delivers content to the various users such as 194 via a local area network (192). Similarly, the host system (130) delivers content to the various users such as 198 via a local area network (196).

FIG. 2 depicts an illustrative System Architecture of MSM-DDS. The system comprises of three layers: Communication layer (200), Scheduling layer (210), and Delivery layer (220). Communication layer further comprises of two subsystems: (a) Command Analysis and Processing subsystem to process the various commands received from other host systems through CON; and (b) QoS Measure subsystem to support in on the fly measurement of quality of service parameters such as delay and error rate with respect to the various flows through CON. Scheduling layer further comprises of two subsystems: (c) Round-Robin Pull subsystem to initiate pull requests to various hosts in order to obtain a multimedia content to be delivered to the users connected via a local area network; (d) Priority Assignment subsystem to help assign priorities for segment requests both at source and at destination systems; (e) Load Balancing subsystem to support the overall enhancement of system throughput. Delivery layer further comprises of three subsystems: (f) Reliability Measure subsystem at destination systems to help in on the fly reliability measurement of the various flows through CON; (g) Targeted Pull subsystem to enhance the quality of service; and (h) Content Delivery Optimization subsystem to enhance the overall deliver efficiency.

FIG. 3 depicts an illustrative Network Architecture of MSMDDS. MSMDDS is a part of both source and destination systems. Source and destination systems are collectively called as hosts (300). Multiple such hosts are interconnected via an overlay network called as Cooperative Overlay Network (CON) (310). Each host supports multiple users via a local area network (320). The main objective of MSMDDS is to achieve content delivery efficiency and this is achieved by segmenting and pulling the segments of a multimedia content from multiple sources. This pulling is based on the overall weight of a particular flow, between a source and a destination, associated with a segment and this weight is computed at a destination system and used also in source systems. Hence, these weights need to be valid across CON demanding cooperation among the host systems.

MSMDDS is a distributed system that runs on each of the host systems. That is, each of the subsystems mentioned above are part of each of the host systems. The subsystems Command Analysis and Processing, QoS Measure, and Reliability Measure are always active in each of the host systems and perform the necessary processing and computations. Whenever a particular host system acts as a destination system with respect to the delivery of a multimedia content, the subsystems Round-Robin Pull, Targeted Pull, and Content Delivery Optimization become active to gather the segments of the multimedia content from the various host systems that act as source systems with respect to this delivery of the multimedia content. In each of these source systems, the subsystem Priority Assignment becomes active to appropriately process the incoming pull requests from the destination system. Finally, the Load Balancing subsystem at the destination system ensures that the round-robin pull requests do not inappropriately load a particular host system.

FIG. 4 provides a brief description of MSMDDS. The system comprises of the following subsystems (400). Command Analysis and Processing subsystem handles the following three commands (also referred as messages):

The command GetContentHosts (405) obtains the list of multiple hosts that are part of CON. Each content host (that host in a CON that has the required content) returns the command positive response and also provides information about the host system load based on the number sessions being handled.

The command GetSegmentsData (410) obtains data related to multiple segments related to one or more sessions from a host.

Finally, GetTargetedData (415) obtains the missing data from a particular more reliable source.

The QoS Measure subsystem (420) monitors flows and measures the following two parameters:

Delay—with respect to each flow (corresponding to the segment data pull) related to a host system, compute and update average delay with respect to that host; Error rate—with respect to each flow (corresponding to the segment data pull) related to a host system, compute and update average error rate with respect to that host.

The Round-Robin Pull subsystem (425) helps in efficiently obtaining content that is available at multiple sources. For a content C and the corresponding session X under consideration, Based on last obtained data and current time, obtain the amount Ai of data that needs to be pulled;

Obtain multiple sources for C;

For each source, obtain quality of service measure, reliability measure, session elapsed time measure, session priority measure, user load measure, and session load measure, and compute a weight (between 0 and 1) based on these measures;

Apportion the amount Ai based on the respective weights of the sources;

And, initiate pull for the apportioned amount from the obtained multiple sources.

The Priority Assignment subsystem (430) is to help revise a pull request priority at a source.

Obtain Session priority of a session associated with a pull request;

Obtain Session elapsed time of the session, and update Session priority based on the inverse normal distribution of elapsed time (that is, assign higher priority for initial and final stages of a session);

Obtain the amount of data requested related to the pull request, normalize the same across amounts related to other pull requests, and assign higher priority if higher is the requested data;

Obtain the amount of data that has been accumulated for delivery for the pull request, normalize the same across amounts accumulated with respect to other pull requests;

Based on all of the above, assign a priority for the pull request.

Note that the above priority assignment is at a source to prioritize the multiple GetSegmentsData requests from multiple hosts (destinations).

The Load Balancing subsystem (435) analyzes a round-robin pull request and ensures that no single host is inappropriately loaded.

The Reliability Measure subsystem (440) monitors the flows and measures the flow reliability with respect to a source based on number of packets lost.

The Targeted Pull subsystem (445) enhances the quality of service by determining the missed packet and pulling the packet from a different source that is more reliable. Determine a missed packet and determine the source of the missed packet; Determine the reliability measure of the source; Determine a second source such that the reliability measure of the second source is greater than or equal to the reliability measure of the source; and initiate the pull of the packet from the second source.

The Content Delivery Optimization (450) subsystem, on need basis, combines multiple session requests into one pull request to achieve higher delivery efficiency.

FIG. 5 provides an illustrative sequence diagram.

Note that, in the following, message and command are used interchangeably.

System H3 (S1) hosts content C1, System H2 (S2) hosts contents C1 and C2, and System H1 (S3) hosts contents C1, C2, and C3; And, System H4 (D1) needs content C1 and pulls C1 through session X1, System H5 (D2) needs contents C2 and C3, and pulls C2 through session X2 and C3 through session X3; System H6 (D3) needs contents C1 and C3, and pulls C1 through session X4 and C3 through session X5;

The elaboration of the sequence diagram is as follows:

| Message ID | Description |
| --- | --- |
| 1 | D1 sends GetContentHosts message to S1 for content C1; |
| 2 | D1 sends GetContentHosts message to S2 for content C1; |
| 3 | D1 sends GetContentHosts message to S3 for content C1; |
| 4 | D2 sends GetContentHosts message to S1 for contents C2 and C3; |
| 5 | D2 sends GetContentHosts message to S2 for contents C2 and C3; |
| 6 | D2 sends GetContentHosts message to S3 for contents C2 and C3; |
| 7 | D1 sends GetSegmentsData message to S1 through X1 for amount AA/2 |
| 8 | D1 sends GetSegmentsData message to S2 through X1 for amount AA/3 |
| 9 | D1 sends GetSegmentsData message to S3 through X1 for amount AA/6 |
| A | D2 sends GetSegmentsData message to S2 through X2 for amount 3AB/4 |
| B | D2 sends GetSegmentsData message to S2 through X2 for amount AB/4 and through X3 for amount AC |
| C | S1 sends response to message 7 (Flow F11) |
| D | S2 sends response to message A (Flow F21) |
| E | S2 sends response to message 8 (Flow F12) |
| F | S3 sends response to message B (Flow F22) |
| G | S3 sends response to message 9 (Flow F13) |
| H | D1 sends GetTargetedData message to S2 |
| I | S2 sends response to message H (Flow 14) |

FIG. 6 provides a brief description of Pull Distribution Algorithm.

The Pull Distribution algorithm (600) is part of a destination system that receives multimedia content from multiple sources. This algorithm plays a crucial role in ensuring efficient delivery of multimedia content to the destination system. The algorithm is to distribute Pull Requests for a Session related to a multimedia Content.

Distribution in a given Destination System Hd is based on the following parameters:

Session specific: Priority, Start Time, End Time, Amount, Number of Users, and Hosts;

Here, Hosts is the number of hosts that contain the multimedia Content.

Host specific: Delay, Error, Loss, Number, of Sessions:

For a given session X related to content C, Let Hosts={H1, H2, . . . , Hy} wherein each Hi hosts C; Here, a host is a source for session X;

Given above, distribute the required amount, A at D, across, Y hosts in Hosts as {A1, A2, . . . , Ay } wherein, Ai is amount (segment) to be pulled from host Hi such that A=Sum (Ai) with 1 <=I<=Y);

For each host Hi in Hosts, {

Delay (605): Let Di be delay associated with host Hi; Normalized Delay Di'=(Di−Dmn)/(Dmx−Dmn) wherein Dmn and Dmx are minimum and maximum delays associated with hosts in Hosts;

Error Rate (610): Let Ei be Error Rate associated with host Hi; Normalized Error Rate Ei'=(Ei−Emn)/(Emx−Emn) wherein Emn and Emx are minimum and maximum error factors associated with hosts in Hosts;

Loss (615): Let Li be packet loss associated with host Hi; Normalized Loss Li'=(Li−Lmn)/(Lmx−Lmn) wherein Lmn and Lmx are minimum and maximum error factors associated with hosts in Hosts;

Session Priority (620): Let P be the priority associated with session X; Normalized Session Priority Pi' is a value between 0 and 1; Higher the priority, the value is closer to 1;

Elapsed Time (625): Let Tp be the elapsed time of session X; Normalized Elapsed Time, T', is based on inverse normal distribution of Tp wherein Tp=(Tc−Ts)/(Te−Ts) with Ts being session start time, Te being session end time, and Tc being current time; That is, close to 0 and close to 1 values of Tp map onto higher values of T'; User Loading (630): Let Un be the number of users for X with respect to D; Normalized User Loading, U'=Un/Umx if Un<Umx else is equal to 1 wherein Umx is the expected maximum number of users at any destination system;

Session Loading (635): Let Xi be the number sessions being processed by Hi; Normalized Session Loading, Xi'= (Xi−Xmn)/(Xmx−Xmn) wherein Xmx and Xmn are the Maximum and minimum session loading with respect to hosts in Hosts; }

For each host Hi,

Compute Hi' (640) as ((1−Di')+(1−Ei')+(1−Li') +Pi' + T' +U' +(1−Xi')) /7;

For each host Hi, compute Wi' (645)=Hi'/(Sum (over 1<=I <=Y) Hi');

Compute Ai (650) as A * Wi';

Thus, a system and method for efficient delivery in a multi-source, multi-destination network is disclosed. Although the present invention has been described particularly with reference to the figures, it will be apparent to one of the ordinary skill in the art that the present invention may appear in any number of systems that exploit redundancy to enhance multimedia content delivery. It is further contemplated that many changes and modifications may be made by one of ordinary skill in the art without departing from the spirit and scope of the present invention.

What is claimed is:

1. A method for delivering a multimedia content through a network interconnecting a plurality of host systems, wherein said multimedia content is to be delivered from a plurality of source host systems of said plurality of host systems to a plurality of destination host systems of said plurality of host systems, wherein said multimedia content comprises a plurality of segments, wherein a segment of said plurality of segments is the amount of said multimedia content to be pulled from a source host system of said plurality of source host systems by a destination host system of said plurality of destination host systems, and said source host system delivers said segment in response to a pull request during a session with an overall priority to said destination host system, using a computer, said method comprising:

computing a normalized delay measure based on a quality of service measure associated with said source host system;

computing a normalized error measure based on said quality of service measure associated with said source host system;

computing a normalized loss measure based on a reliability measure associated with said source host system;

determining a normalized session priority measure based on a priority of a session related to said source host system;

computing a normalized transformed elapsed time measure based on an inverse normal distribution of a normalized elapsed time of said session;

computing a normalized user loading measure based on a load measure associated with said destination host system, said session, and a pre-defined maximum number of users;

computing a normalized session loading measure based on a load measure associated said source host system;

computing a normalized measure of a plurality of normalized measures based on said normalized delay measure, said normalized error measure, said normalized loss measure, said normalized session priority measure, said normalized transformed elapsed time measure, said normalized user loading measure, and said normalized session loading measure, wherein each of said plurality of normalized measures is associated with a host system of said plurality of source host systems;

computing a normalized weight related to said source host system based on said normalized measure associated with said source host system and said plurality of normalized measures;

computing said segment to be pulled from said source host system based on said multimedia content and said normalized weight related to said source host system;

determining a session priority associated with said session; and computing said overall priority of said pull request based on said session priority, an elapsed time associated with said session, an amount of data associated with said pull request, and an accumulated amount of data associated with said pull request.

* * * * *